May 7, 1935.  R. E. NEWELL  2,000,294

THERMOSTATIC STRUCTURE

Filed Dec. 8, 1933  2 Sheets-Sheet 1

INVENTOR
Robert E. Newell
By Byrnes, Stebbins,
Parmelee & Blenko
Attorneys

May 7, 1935.  R. E. NEWELL  2,000,294
THERMOSTATIC STRUCTURE
Filed Dec. 8, 1933  2 Sheets-Sheet 2
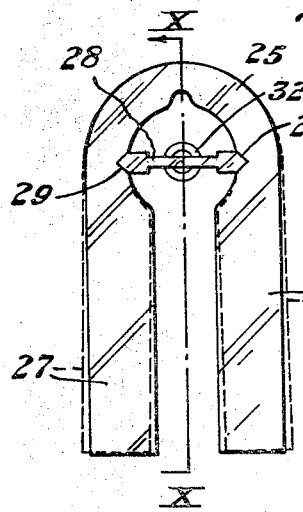
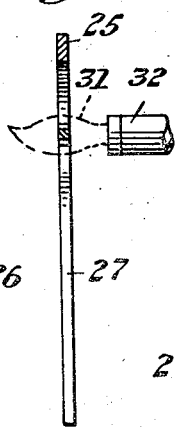
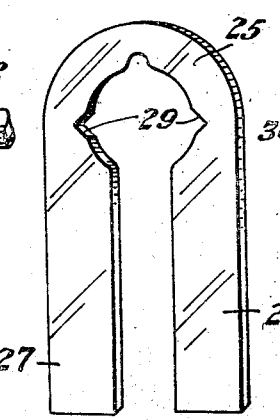
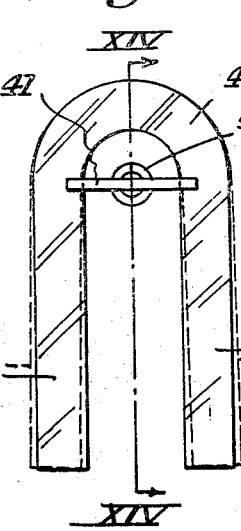
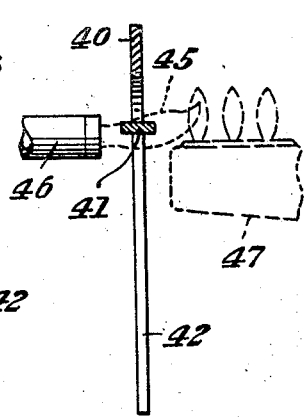
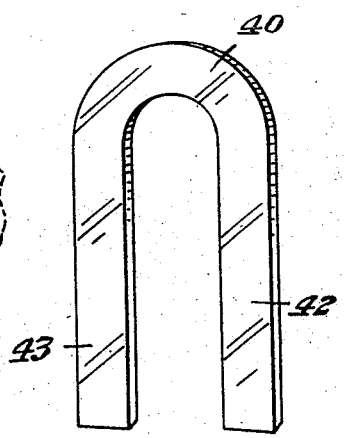
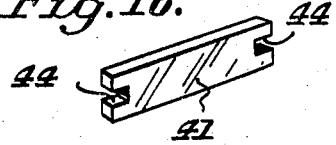
INVENTOR Patented May 7, 1935

2,000,294

UNITED STATES PATENT OFFICE 2,000,294

THERMOSTATIC STRUCTURE

Robert E. Newell, Irwin, Pa., assignor to Robertshaw Thermostat Company, Youngwood, Pa., a corporation of Pennsylvania Application December 8, 1933, Serial No. 701,465

6 Claims. (Cl. 297—11)

The present invention relates generally to thermal control, and more particularly to thermostatic structures or elements for obtaining temperature control or regulation, or for operating control devices such as valves, switches, or the like, in various types of systems.

Heretofore, various types of thermostatic structures or thermally responsive devices have been provided for obtaining temperature control or regulation, or for operating control devices such as valves, switches, and the like, such as the well-known rod and tube type of thermostat, or the so-called "bi-metallic" type, which comprises two metallic strips having different coefficients of expansion rigidly secured together, or the expansible fluid type. All of these types and the others known in the art are objectionable in various respects and are not conveniently adaptable to the various uses to which they may be put. In many installations of such structures, it is necessary to provide compensating mechanism to compensate for movement or expansion resulting from temperatures adjacent such structures, and which it is not desired that they respond to. The cost of manufacture of the presently known types of constructions is considerable and is in excess of that of the construction which I provide by my invention.

By my invention, I provide an entirely novel type of thermostatic structure which may be used for temperature control or regulation, or for operating control devices such as valves, switches, and the like, which overcomes many of the objections to the prior art structures, and which has a relatively low cost of manufacture.

In accordance with my invention, I provide a thermostatic structure comprising essentially a member having oppositely disposed arm portions and a thermally responsive element cooperating therewith and arranged to move one of the arms relative to the other upon expansion and/or contraction of the thermally responsive element. I prefer to use a substantially U-shaped member having oppositely disposed arm portions of any desired length. One of the arms of this U-shaped member may be rigidly secured to a support and the other arm permitted to remain free of the support and to be moved relative to the other arm by the thermally responsive element for operating any desired control member such as a valve, a switch, or the like. The thermally responsive element cooperating with the U-shaped member may be formed in various different ways and positioned in various different locations, as will be pointed out hereinafter, but I prefer to use a plate or bar extending between the arms of the U-shaped member which is arranged to move the free arm relative to the rigidly secured arm upon expansion and/or contraction.

In the accompanying drawings, I have shown a preferred embodiment of my invention and several modifications thereof. In the drawings, I have shown my invention as applied to a structure wherein heat is imposed directly upon the thermally responsive element or insert positioned between the arms of the U-shaped member. My invention, however, is not limited to uses wherein temperatures to which it is desired that the structure respond are imposed directly on the thermally responsive element itself and not upon the U-shaped member. My invention is equally applicable to a structure wherein both the thermally responsive element and the U-shaped member are subjected to the same temperature which is the temperature to which the element is arranged to respond and control.

In the drawings—

Figure 9 is a further modified form of thermostatic structure provided by my invention;

Figure 10 is a sectional view taken along the line X—X of Figure 9;

Figure 11 is a perspective view of the U-shaped member shown in Figure 9;

Figure 12 is a perspective view of the thermally responsive element shown in Figures 9 and 10;

Figure 13 is a side elevational view of a further modified form of thermostatic structure provided by my invention;

Figure 14 is a sectional view taken along the line XIV—XIV of Figure 13 and showing a pilot burner and a main burner cooperating with the thermostatic structure which I provide;

Figure 15 is a perspective view of the U-shaped member of the structure shown in Figures 13 and 14; and Figure 16 is a perspective view of the thermally responsive element of the structure shown in Figures 13 and 14.

Figure 1:
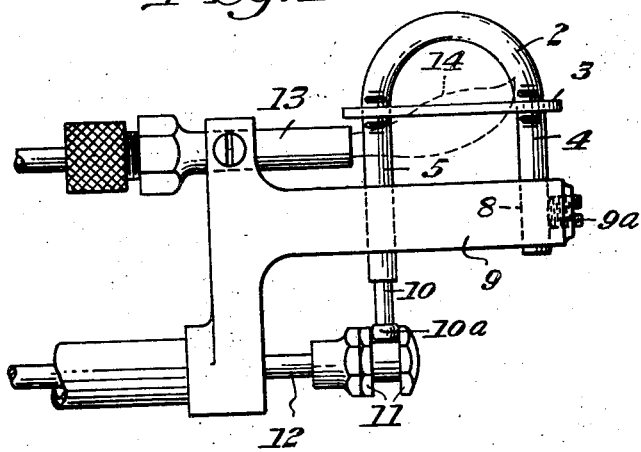
Figure 1 is an elevational view of the thermostatic structure which I provide conveniently mounted to respond to temperatures imposed on the thermally responsive element and to operate a control member.
Figure 3:
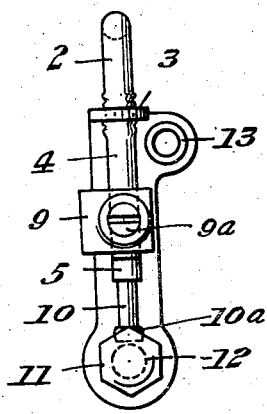
Figure 3 is an end elevational view of the structure shown in Figure 1.
Figure 2:
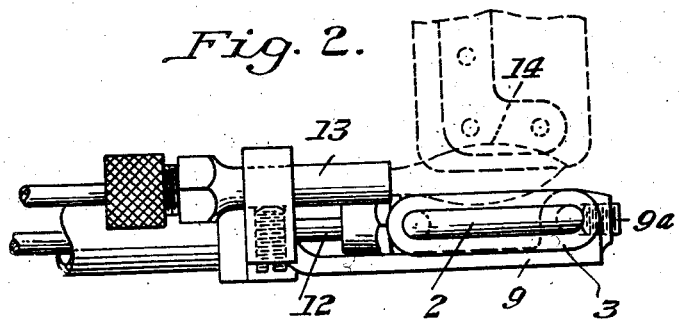
Figure 2 is a top plan view of the structure shown in Figure 1 and showing a burner cooperating with the pilot light.
Figure 4:
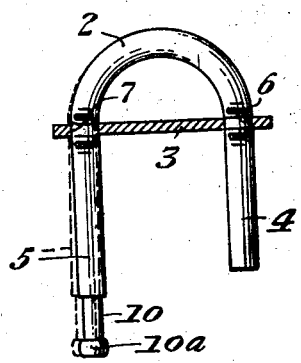
Figure 4 is an elevational view, partly in section, of the thermostatic structure dissociated from a supporting means and the pilot light, the thermally responsive element being shown in section.

In Figures 1 to 5, inclusive, I have shown a preferred form of the invention. As shown in these figures, the thermostatic structure which I provide comprises a substantially U-shaped member 2 and a thermally responsive cross plate 3. The U-shaped member 2 has oppositely disposed arm portions 4 and 5 which are adapted to extend through openings 6 and 7 in the cross plate 3 so that the thermally responsive cross plate 3 may be appropriately positioned adjacent the return bend of the U-shaped member. The U-shaped member 2 may be sprung apart slightly so as to hold the thermally responsive member 3 in the desired position. The arms 4 and 5 of the U-shaped element are preferably swaged on both sides adjacent the cross plate in order to prevent the plate from sliding off or creeping backwards.

The U-shaped member 2 of this embodiment may be formed of a ⅛ inch round alloy steel rod and the arms 4 and 5 thereof may be of any suitable length. The thermally responsive cross plate 3 of this embodiment is preferably of material having the same coefficient of expansion as the U-shaped member.

The arm 4 of the U-shaped member 2 extends into an opening 8 in a bracket 9 and is rigidly secured therein by means of a set screw 9a. The opposite end 5 of the U-shaped element is allowed to remain free of the bracket. This arm is provided with a reduced portion 10 having a knob 10a on the end thereof which is adapted to cooperate with nuts 11 threaded on a rod 12 which may be used for operating any device such as a valve, a switch, or the like. It will be understood, of course, that any other type of connection may be provided between the free arm of the U-shaped element and the control member.

A burner 13 is mounted on the bracket 9 and so positioned as to cause the flame 14 thereof to extend substantially parallel with the thermally responsive plate 3 of the thermostatic structure which I provide. The burner 13 is located sufficiently close to the thermostatic structure to cause the flame 14 to impinge on the thermally responsive element and expand it when the pilot is operating.

The flame 14 impinging on the thermally responsive plate 3 causes the plate to expand and force the free arm 5 of the U-shaped element to the left, as viewed in Figure 1. This movement of the arm 5 operates to move the rod 12 or any other type of controlling member cooperating with the arm 5.

The thermally responsive plate 3, as stated above, is made of a material which has substantially the same co-efficient of expansion as that of the U-shaped element. Consequently, when both the U-shaped element and the thermally responsive plate 3 are subjected to temperatures other than those to which the thermostatic structure is intended to respond, the parts will expand uniformly and will not operate the controlling member unless the thermally responsive plate 3 is also subjected to temperatures to which it is designed to respond. In other words, the structure which I provide is self-compensating in action and the temperature of the air surrounding the thermostatic structure may be very materially increased or decreased without affecting the accuracy and operation of the structure which I provide.

This has been one of the principal defects of safety cut-off structures such as have been used in cutting off the supply of fuel to burners in the event that the pilot light itself becomes extinguished. Such structures have not been self-compensating and the operation thereof is materially affected by local heat, the effect of which has been to cause operation of the structure. Local heat, however, does not affect the operation of the structure which I provide as it merely raises the entire unit to a higher temperature, but the temperature differential between the parts of the thermostatic structure remains the same. Therefore, when the pilot flame is extinguished, this differential disappears just as quickly as when the whole unit is cold. Therefore, local heat has no effect whatever on the element which I provide.

Figure 6:
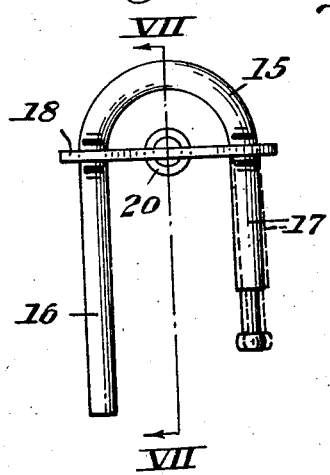
Figure 6 is a side elevational view of a modified form of thermostatic structure provided by my invention.
Figure 7:
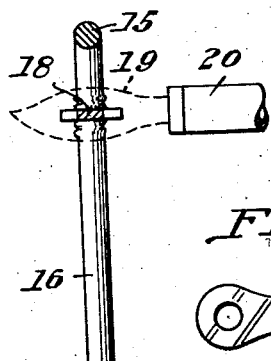
Figure 7 is a sectional view taken along the line VII—VII of Figure 6.
Figure 5:
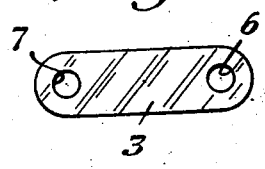
Figure 5 is a plan view of the thermally responsive element shown in Figures 1 to 3, inclusive.
Figure 8:
Figure 8 is a plan view of the thermally responsive element shown in Figures 6 and 7.

In Figures 6, 7 and 8, I have shown a modified form of the structure which I provide. In this form, the U-shaped element 15 is provided with oppositely disposed arms 16 and 17, the arm 17 being shorter than the arm 16, the latter being the arm which is adapted to be rigidly secured to a suitable support. In this embodiment, the thermally responsive plate 18 is cut away adjacent the central portion thereof to provide a smaller cross sectional area on which the flame 19 of the pilot burner 20 impinges. The plate 18 is, of course, provided with openings adapted to cooperate with the arms 16 and 17 so as to permit the plate to be positioned adjacent the return bend of the U-shaped member 15. In placing the plate 18 in place, the U-shaped element 15 is sprung slightly to hold it in position.

I have found that it is highly desirable to use a plate having openings therein which cooperate with the arms of the U-shaped member for either pushing or pulling the free arm of the U-shaped member. A bridging member is entirely satisfactory but it has no ability to pull the U-shaped member inwardly as the bridging member contracts. Therefore, where a bridging member only is provided in place of a plate, such as plates 3 and 18, a loading spring must be used. It is highly desirable, however, to avoid the use of any such spring, especially one of sufficient strength to be practical. Where a spring is provided, it imposes a continuous load on the element when it is hot, thus deforming the metal and causing the structure to change its adjustment.

In Figures 9 to 12, inclusive, I have shown a further modification of my invention. In this embodiment, the U-shaped member 25 is appropriately formed out of sheet metal or the like. The U-shaped element 25 is provided with oppositely disposed arm portions 26 and 27. A portion of the U-shaped member 25 is cut away adjacent the return bend thereof so as to provide adequate space within which to position the thermally responsive element 28. Grooves 29 are provided on the inner surface of the cut-out portion to receive the pointed ends 30 of the thermally responsive element 28 and to support it in position. The insert or thermally responsive element 28 is pressed into place between the arms 26 and 27 springing the ends of the U-shaped member slightly apart.

It will be understood that as the thermally responsive element 28 is subjected to a flame 31 of a burner 32, it will expand and force the arms 26 and 27 to move relative to each other to a position such as shown in dotted lines in Figure 9.

It will also be understood that the arm 26 or the arm 27 will, in operation, be suitably supported and will remain stationary while the other arm will move relative to it upon expansion and contraction of the thermally responsive insert or element 28.

In Figures 13 to 16, inclusive, I have shown a still further modification of my invention. In this embodiment, the U-shaped member 40 is of a slightly different configuration than that shown in Figures 9, 10 and 11, the principal difference being that in this embodiment the inner portion of the U-shaped member adjacent the return bend is not cut away. A thermally responsive element or insert 41 is positioned between the arms 42 and 43 of the U-shaped member. The thermally responsive element 41 is pressed into place, thereby springing the arms of the U-shaped member slight apart. This thermally responsive element 41 is provided with grooves 44 adapted to cooperate with the arms of the U-shaped member to maintain the element in appropriate position and prevent it from sliding through the U-shaped member. The flame 45 of a pilot or other burner 46 may impinge upon the thermally responsive element 41 and expand the same to operate any desired type of control mechanism. The flame of the pilot 46 will be so positioned as to ignite the adjacent main burner 47.

In all of the above described embodiments of the invention, the thermally responsive element or insert has a relatively small cross sectional area as compared with that of the U-shaped member. This element is preferably made of reduced size so as to quickly reach maximum temperatures and to quickly cool when the flame is removed therefrom. It must, however, have a sufficient cross section to carry the load imposed upon it at high temperatures without crushing or "creeping".

To avoid any changes in the adjustment of the structure while it is in service, as a result of over-strains through errors in manufacture, the assembled unit is preferably annealed in order to relieve any initial strains. The annealing operation is preferably carried out at a temperature approximately equal to or slightly greater than the maximum temperature under which the device will operate.

One of the particular advantages of a structure of this character is, as pointed out above, that it will compensate for surrounding heat affecting both members. No appreciable motion will result if the structure is subjected to varying temperatures, the movement of the U-shaped member resulting solely from the effect of the flame upon the thermally responsive element. It will be understood, of course, that the thermally responsive element and the U-shaped member will have substantially the same coefficient of expansion in order to obtain this compensating feature.

I have found it desirable to position the thermally responsive element adjacent the return bend of the U-shaped member. By positioning it adjacent the return bend of the U-shaped member, the power of the structure is greater than would be obtained if the thermally responsive element were positioned closer the ends of the U-shaped member. It will be understood, however, that the thermally responsive element may be placed at any desired distance from the return bend of the U-shaped member.

Another advantage of a structure such as that which I provide is that it is of such character as to permit the pilot burner to impinge on and alter the temperature of a relatively small element. The flame of the pilot burner may be directed in a crosswise manner so that it can be utilized for igniting the adjacent burner, as shown in Figures 7, 10 and 14, or it may be directed parallel with the thermally responsive element and the adjacent burner. If it were necessary to heat the U-shaped member itself, or a relatively large thermostatic element, it would obstruct the flame passage and interfere with the combustion and the flame of the pilot burner could not be directed in such manner as to satisfactorily ignite the adjacent burner. I prefer to make the insert or thermally responsive element substantially flat so that it will not interfere to an appreciable extent with the flame.

In Figures 1 to 5, inclusive, I have shown an embodiment wherein the flame need not be directed in a crosswise manner through the U-shaped element in order to ignite the adjacent burner. The thermally responsive element positioned between the arms of the U-shaped member extends substantially parallel with the flame of the burner and is positioned in close proximity to the flame of the pilot burner so that the flame will strike one edge thereof and cause it to expand and operate the desired controlling member. Where the thermostatic structure is positioned in this manner, the main burner may be also located adjacent the pilot burner. One of the particular advantages of this arrangement is that it ensures ignition of the main burner even though the pilot flame subsides to half its normal height. If the pilot flame is pointed directly toward the burner jets, it may leave the burner jets as it becomes smaller. This tends to create a dangerous condition as the pilot burner may remain ignited but fail to ignite the main burner. The burner may and probably would be still sufficiently hot to keep the thermally responsive element in an expanded position and the control member operated.

It will be understood, of course, that in any installation where the compensating feature above referred to is relatively unimportant and the thermostatic structure subjected to substantially uniform temperatures, the insert and the U-shaped member need not necessarily be of material having substantially the same coefficients of expansion. It is only necessary that they have substantially the same coefficient of expansion where they are liable to be subjected to temperatures other than that for which the structure has been adjusted.

It will be readily seen that the structure which I provide may be used as an ordinary thermostat for temperature control or regulation, as well as for operation where only the thermally responsive insert is subjected to the operating temperature. In order to make the structure which I provide operate as an ordinary thermostat for temperature control, it is only necessary to provide an insert or thermally responsive element having a different coefficient of expansion than that of the U-shaped member. For example, the U-shaped member may be formed of a substantially non-expansible material, and the thermally responsive insert made of an expansible material. Where the structure is so arranged, the expansible insert will expand or contract as the surrounding temperature is raised or lowered and the arms of the U-shaped element will be moved relative to each other.

One of the inherent advantages of a thermostat of this character is that it will compensate for sudden changes of temperatures so as to reduce "overshoot" in ovens; that is, a condition where the temperature goes above that desired before the thermostat actually operates to shut off the heating fluid. This is due to the relative quickness of response of the light insert as compared to the heavier U-shaped member. Due to the heavy action of the insert, the control means will act to check rapidly rising and falling temperatures before the thermostat has actually set itself for any given temperature change. This will be understood by those familiar with the various methods now used to obtain compensation or to render thermostats more quickly responsive to temperature changes.

In describing my invention, I have spoken of the one member as being substantially U-shaped. By using this term, I do not intend to limit my invention to a structure wherein the oppositely disposed arms are parallel or of equal length. The arms may be of different lengths and need not necessarily be substantially parallel. I have used the term "U-shaped member" to define a curved member of any character whatsoever having oppositely disposed arm portions adapted to cooperate with a thermally responsive element extending therebetween.

While I have shown and described a preferred embodiment of my invention and several modifications thereof, I do not intend to be limited thereby, as my invention may be otherwise embodied within the scope of the appended claims.

I claim:

1. As a new article of manufacture, a thermostatic structure comprising a support, a curved member having oppositely disposed arm portions, one of said arms being rigidly secured to said support, and a thermally responsive element positioned within said curved member and extending between oppositely disposed arm portions thereof, and arranged to impart relative movement to said arms upon expansion of said element.

2. As a new article of manufacture, a thermostatic structure comprising a support, a curved member having oppositely disposed arm portions, one of said arms being rigidly secured to said support, and a thermally responsive element positioned within said curved member and extending between oppositely disposed arm portions thereof, and arranged to impart relative movement to said arms upon contraction of said element.

3. As a new article of manufacture, a thermostatic structure comprising a support, a curved member having oppositely disposed arm portions, one of said arms being rigidly secured to said support, and a thermally responsive element positioned within said curved member and extending between oppositely disposed arm portions thereof, and arranged to impart relative movement to said arms upon expansion of said element, said element having a relatively small cross sectional area as compared with that of said curved member.

4. As a new article of manufacture, a thermostatic structure comprising a support, a substantially U-shaped member having one arm thereof rigidly secured to said support, and a thermally responsive element extending between the arms of said member and arranged to impart movement to said free arm of said U-shaped member, said element having an appreciably greater coefficient of expansion than said member.

5. In a thermal control system, the combination of a member having oppositely disposed arms, means connected with one of said arms for supporting said member, a thermally responsive element cooperating with said oppositely disposed arms and arranged to move one of said arms relative to the other, and a controlling member operatively connected with said movable arm.

6. In a thermal control system, the combination of a support, a substantially U-shaped member having oppositely disposed arm portions, one of said arm portions being rigidly secured to said support, a thermally responsive element extending between said arms and arranged to move one of said arms relative to the other, and a controlling member operatively connected with said movable arm.

ROBERT E. NEWELL.